(12) United States Patent
Mensch

(10) Patent No.: US 7,950,037 B2
(45) Date of Patent: May 24, 2011

(54) WIRELESS ENTERTAINMENT SYSTEM

(75) Inventor: Linda S. Mensch, Chicago, IL (US)

(73) Assignee: Linda S. Mensch, Chicago, IL (US)

( * ) Notice: Subject to any disclaimer, the term of this patent is extended or adjusted under 35 U.S.C. 154(b) by 2389 days.

(21) Appl. No.: 09/809,775

(22) Filed: Mar. 16, 2001

(65) Prior Publication Data

US 2002/0133824 A1  Sep. 19, 2002

(51) Int. Cl.
*H04N 7/16* (2006.01)
*H04N 7/173* (2006.01)

(52) U.S. Cl. ........... 725/62; 725/133; 725/141; 725/153

(58) Field of Classification Search .............. 725/62–73, 725/86, 121, 123, 133, 141, 153
See application file for complete search history.

(56) References Cited

U.S. PATENT DOCUMENTS

| | | |
|---|---|---|
| 5,247,347 A | 9/1993 | Litteral et al. |
| 5,515,173 A | 5/1996 | Mankovitz et al. |
| 5,541,638 A | 7/1996 | Story |
| 5,552,837 A | 9/1996 | Mankovitz |
| 5,553,123 A | 9/1996 | Chan et al. |
| 5,592,537 A | 1/1997 | Moen |
| 5,701,383 A | 12/1997 | Russo et al. |
| 5,812,930 A * | 9/1998 | Zavrel ............... 725/62 |
| 5,812,931 A * | 9/1998 | Yuen ............... 725/123 |
| 5,815,195 A | 9/1998 | Tam |
| 5,974,222 A | 10/1999 | Yuen et al. |
| 5,988,078 A | 11/1999 | Levine |
| 6,052,145 A | 4/2000 | Macrae et al. |
| 6,137,950 A | 10/2000 | Yuen |
| 6,157,377 A | 12/2000 | Shah-Nazaroff et al. |
| 6,470,378 B1 * | 10/2002 | Tracton et al. ............ 709/203 |
| 6,792,280 B1 * | 9/2004 | Hori et al. ............ 455/517 |
| 7,454,776 B1 * | 11/2008 | Walker et al. ............ 725/122 |
| 7,634,794 B1 * | 12/2009 | Paik et al. ............ 725/62 |

OTHER PUBLICATIONS

Grover et al. "TV GUY Will Gemstar-TV Guide's Henry Yuen Take Control Of Your TV Set?" *Business Week*, Mar. 12, 2001, pp. 66-70, 72, 74, 76.

* cited by examiner

*Primary Examiner* — Hunter B Lonsberry
(74) *Attorney, Agent, or Firm* — Greer, Burns & Crain, Ltd.

(57) ABSTRACT

A wireless entertainment system includes a delivery station, a wireless telephone network, and a receiver. Entertainment, such as a motion picture, is ordered by a customer through a wireless telephone, and is delivered to the customer through the wireless telephone network. The entertainment is delivered in a non-permanent method (streaming) to the customer through the network, to a receiver, such as a television viewing set in the customer's home, or to an intermediate storage medium, such as a memory device, that is then communicated directly to a viewing device.

10 Claims, 4 Drawing Sheets

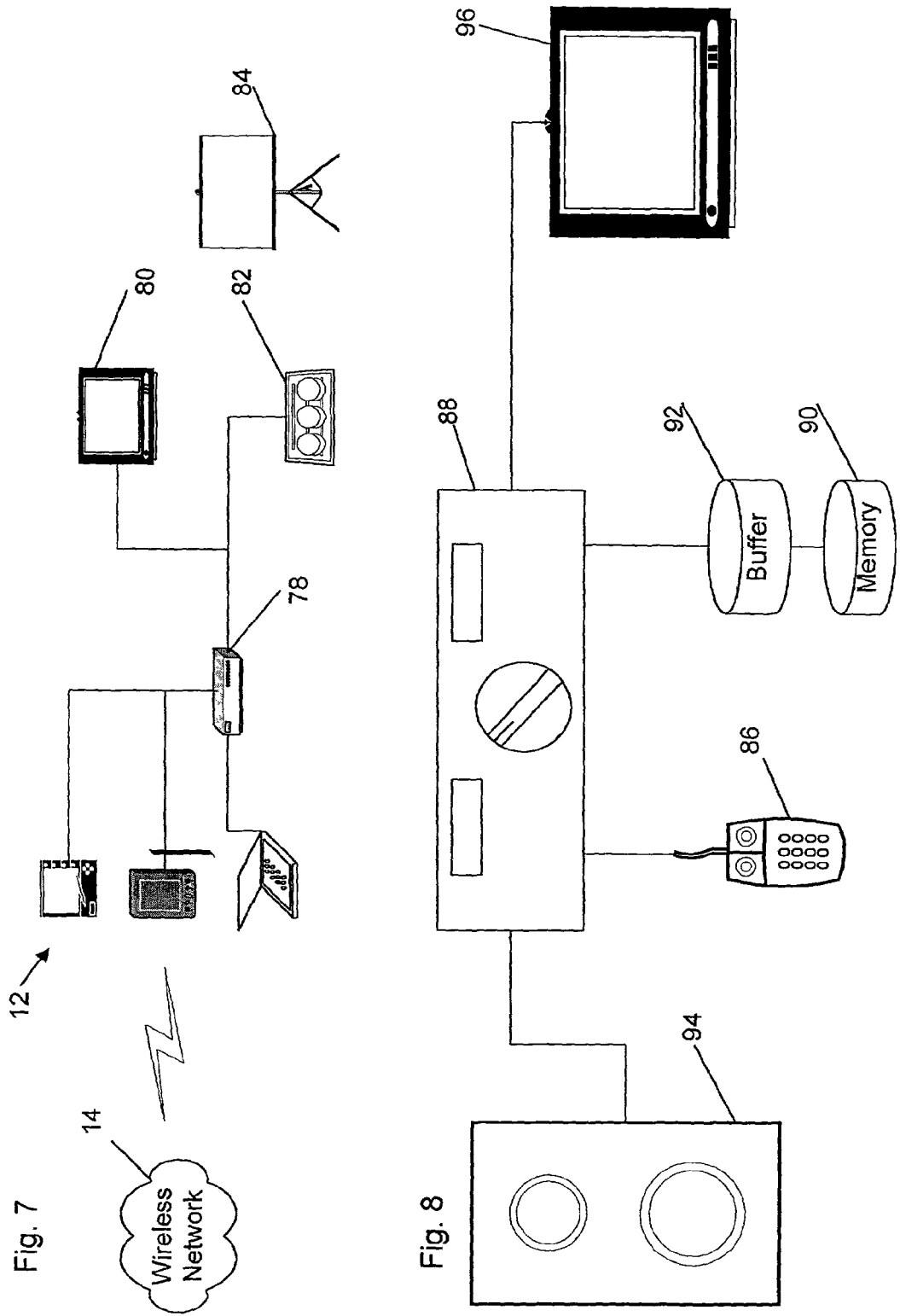

WIRELESS ENTERTAINMENT SYSTEM

BACKGROUND OF THE INVENTION

Wireless telephones are becoming more and more popular world-wide, providing telecommunications options in the United States, in Europe, and in less-developed countries around the world. In countries that have developed a communications infrastructure, cell phones are popular because they are used more conveniently and more spontaneously than traditional telephones connected by hard-wire landlines. Even though long-distance communications have been relayed by means other than landlines for many years, cell phones may provide short, medium and long-distance communication facilities without regard to any existing infrastructure.

In countries lacking an extensive telecommunications infrastructure, cell phones may be the only option, outside the most heavily-populated cities. Thus, there has been a virtual explosion in the use of cell phones in developing nations. Cell phones provide much-needed communications facilities and make lives easier and more convenient by making communications not only possible, but also convenient. It is possible that developing countries, lacking infrastructure and having very large land masses, may never build expensive infrastructures covering those vast areas. Since cell phones can provide excellent, low-cost coverage, such countries may permanently forego installing a telecommunications infrastructure.

Without such an infrastructure, telephone (copper) landlines and cable (fiber optic) landlines may not be available to serve customers. In these cases, there will be no infrastructure to bring in all the other private or commercial services, whether offered by private companies or through governmental agencies in some countries, offered through landlines. These services include, but are not limited to, cable television, Internet service, play-per-pay video or music, and the like. What is needed is a way to bring news and entertainment to people not served by a hardwired telecommunications infrastructure. What is needed is a system to bring commercial news and entertainment to persons whose communications facilities may be limited to cell phones.

BRIEF SUMMARY OF THE INVENTION

One aspect of the invention is a system for delivering entertainment over a wireless network, where a delivery station provides entertainment or programming and a receiver receives such programming in response to an order from a person or a customer. The receiver may be a cellular telephone or a receiver built into a television viewing set or other device suitable for receiving and displaying the entertainment. The person ordering entertainment may enter and transmit the order via a cell phone to the company or agency providing the entertainment, such as an entertainment company that provides programming over a wireless network. The entertainment company then sends the entertainment or programming to the customer via the wireless network to a receiver suitable for displaying or for temporarily storing the entertainment or programming. Entertainment includes, but is not limited to, motion pictures, television shows, video games, educational, cultural or political events, sports programming, news, financial news, weather, and music.

Another aspect of the invention is a method for providing entertainment, in which a person desiring the entertainment orders the entertainment, and preferably as a part of the information sent to order the entertainment, identifies himself or herself. The method includes automatic billing for the entertainment to the person ordering the entertainment, and then delivering the entertainment through a wireless network. In order to contain costs and provide rapid, accurate billing to customers, the process should be as automated as possible, rarely requiring human intervention. The automated aspect of the invention is important for high-volume, low-cost, rapid processing of both billing and delivering.

Providing means the process by which an enterprise makes available an entertainment product or service to customers, delivers the product or service to those customers, and receives compensation in return. The enterprise may be a private, commercial company, or may be a governmental enterprise, or in some instances, may be a combination of the two. For example, a governmental information agency may contract for a privately-owned or publicly-owned company to provide the service and collect the revenue from such entertainment. The invention is not limited to enterprises which are commercial, rather than governmental or mixed enterprises, but rather includes all enterprises providing entertainment and receiving compensation in the manner described herein.

BRIEF DESCRIPTION OF SEVERAL VIEWS OF THE DRAWINGS

FIGS. 7-8 are block diagrams representing ways to access entertainment using the present invention.

DETAILED DESCRIPTION OF THE INVENTION

Figure 1:
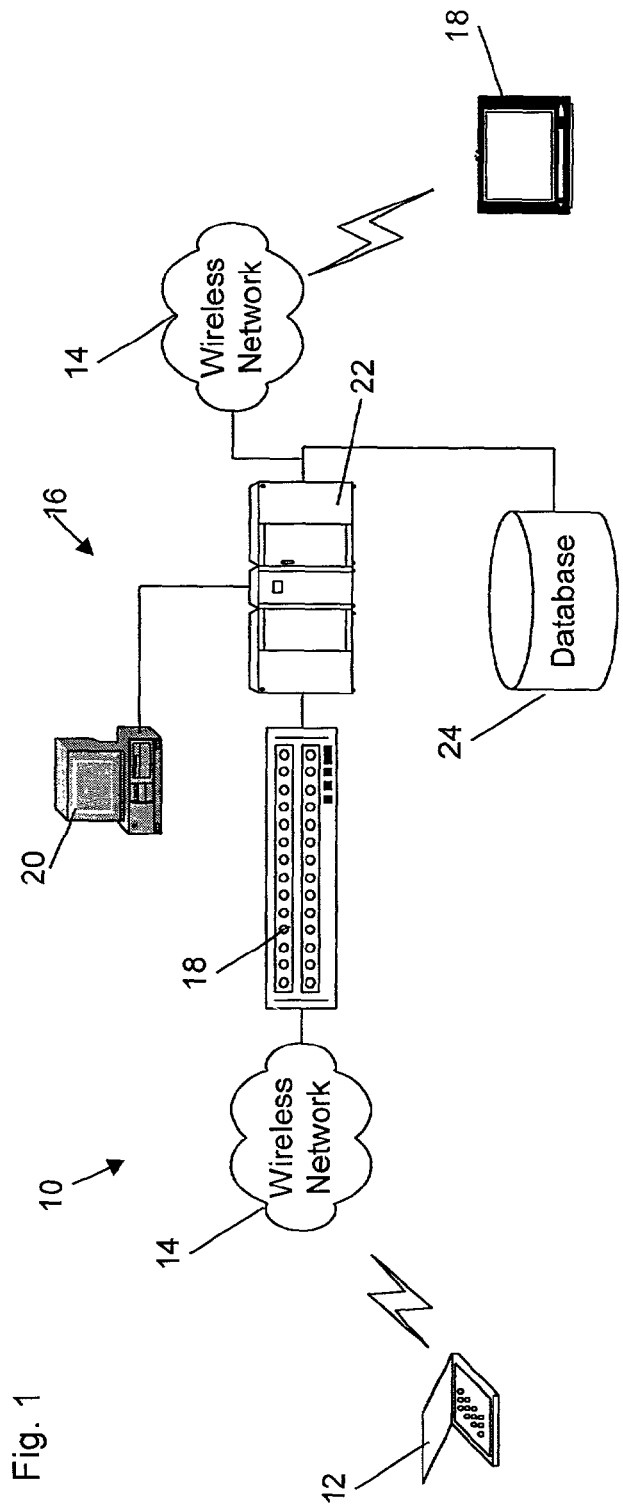
FIG. 1 is a pictorial representation of a system for delivering entertainment.

FIG. 1 is a representation of a system 10 for delivering entertainment through a wireless network, in which a customer orders entertainment through a wireless medium, such as a cellular telephone, and the enterprise delivers entertainment through a wireless medium, such as a wireless network. A customer orders entertainment through a wireless communication device 12, such as a cellular telephone. A wireless network 14 relays the order to a delivery station 16. The delivery station may include many functions that receive and process the order, bill the customer for the entertainment, and deliver the entertainment. Included in the station may be interface device 18, such as a modem, one or more computer workstations 20, a mainframe or other suitable computer 22 and a database 24 of entertainment. Entertainment need not be maintained only at the delivery station, but may be available elsewhere for relaying or delivery to the station prior to, or simultaneous with, delivery to the customer. After the delivery station order receives and processes the order, the wireless network 14 relays the product to a cell phone 12 or to a receiver 18 in real time for immediate viewing or for storage at the receiver for time-delayed viewing.

Figure 2:
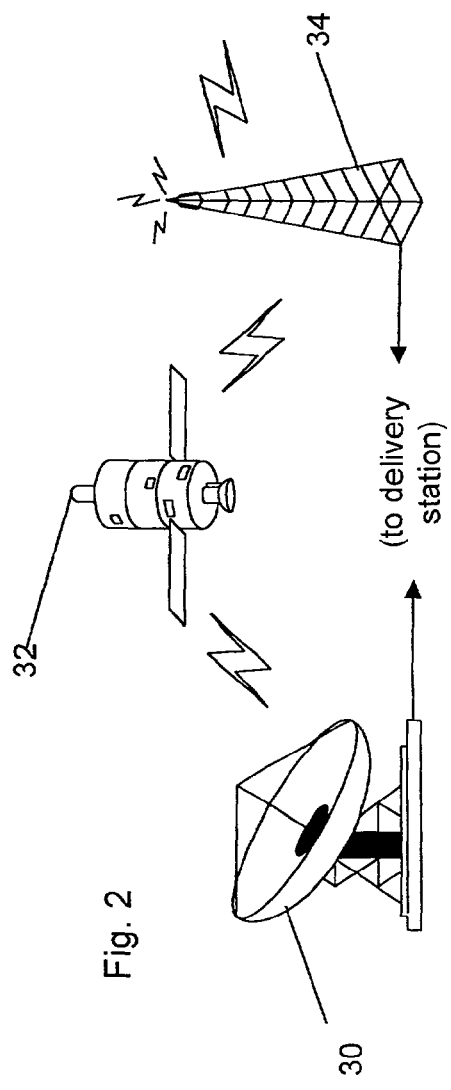
FIG. 2 is a representation of a delivery station for delivering entertainment.

FIG. 2 illustrates some of the possible components of the wireless network used to relay the entertainment signal to the customer receiver. Included are such items as a satellite dish 30 for sending and receiving signals to and from a satellite 32 held in orbit above the earth. In addition, a wireless network may include a transmission tower 34 for sending signals to customers and receiving signals from customers. Such towers may receive signals from one or more radio or microwave broadcast or transmission devices.

The wireless network relays information from a customer concerning the order, the identification of the customer and his or her account, and other information useful to either the customer or the providers of the entertainment. In one embodiment, a customer turns on a cell phone and dials an Internet web site. The customer may have a unique logon identification that identifies him or her to the web site. The customer then selects entertainment or programming for immediate or later viewing, and orders the entertainment or program. The wireless network relays the order, and other pertinent identifying information, to the delivery station. The delivery station processes the order and may separate the ordering information into portions that deal separately with the entertainment order and with billing for the order. In a preferred embodiment, the billing for the entertainment is forwarded to a cellphone account for the customer, and is added to the customer's cellphone bill. The delivery station processes the order and readies the entertainment programming for relaying or transmission to the customer. The programming is relayed, again through a wireless network, to a receiver accessible by the customer, for viewing or listening to the program.

In one embodiment, a viewer receives the entertainment in a fashion that will not be amenable to permanent storage, but rather for one-time viewing, that is, the delivery station delivers the entertainment or programming by streaming in real time to the customer rather than downloading a copy of the entertainment data. In another embodiment, the programming is downloaded in its entirety, but with a limit on the number of times and/or the period over which the entertainment or programming may be viewed. The information included in the customer's order may include a time for viewing, so that the streaming or downloading may be timed to the convenience of the customer. In another embodiment, the entertainment may be sent for temporary storage and later viewing, allowing time for the information exchange.

The memory for storing the entertainment data may reside in the customer's cellphone or any other device suitable for storing the data, and perhaps also suitable for appropriate connection to a viewing device. For example, a memory device may be installed in the customer's cellphone or in a memory unit, for example a hard drive, connected to a receiving device, such as a television. The delivery station then delivers the programming selection to the cellphone or the remote memory device, and the cellphone or other remote memory device then connects to an audio, video, or both audio and video display device. The entertainment or programming may be downloaded rather than streamed with a specific time for initiating the data transfer or for defining a period after which the utility of the programming ends, such as a specific time several hours in the future (for instance, 11:00 p.m. local time) or after a time lapse (for instance, four hours after downloading the data).

Figure 3:
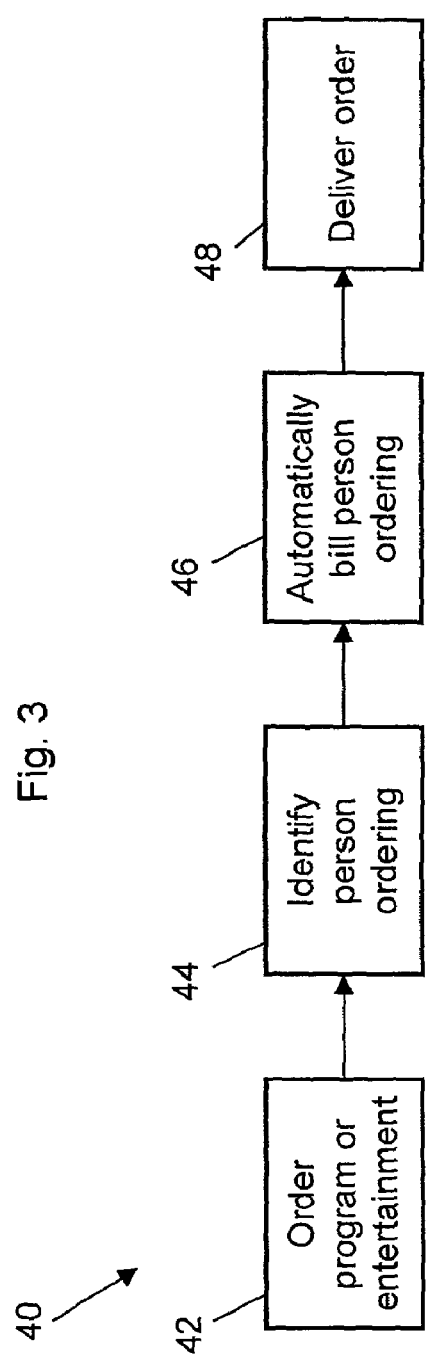
FIGS. 3-6 are flow charts depicting processes for marketing and delivering entertainment through a wireless delivery system.

FIG. 3 is a flowchart for one method 40 of practicing the invention. A customer orders 42 programming or entertainment over a wireless network, preferably by making a telephone call through a cellphone. The telephone call includes all necessary information for the delivery station to identify 44 the person ordering the entertainment. The information also includes identification sufficient to automatically bill 46 the person ordering the information. For example, a particular cellphone and its telemetry may identify the caller with sufficient particularity so that the caller may be billed for the telephone call. The delivery station may also use that same information to identify the caller and thus identify who is ordering the entertainment and who is responsible for the bill.

In other embodiments, the caller identification may be a default for billing for the entertainment order, subject to change by the caller if the entertainment is to be billed to another. This provision may not be preferred, since it adds complexity and the possibility of error or fraud when the caller makes additional entries to identify another party as the party responsible for the bill. Lastly, the delivery station delivers the entertainment 48 to a selected customer and/or device. The caller identification may have an associated default entry for the delivery of the entertainment, that is, the person or device to receive the entertainment. A caller may also have the option of specifying a receiver other than the caller who is billed for the entertainment. Again, this option of a different receiver for the entertainment adds complexity and the possibility of error when making additional entries, and may not be the most preferred method.

The information needed for ordering, identifying, billing and delivering the entertainment may be obtained from a cell phone-identifying signal that is sent when the cell phone begins a telephone call. Alternatively, the caller may enter a unique code or password that identifies this information. Other methods of identifying the billing and receiving parties may also be used, so long as the delivery station can obtain this information with sufficient particularity to deliver and bill for entertainment. A person to whom the entertainment is to be delivered may thus be a person designated for receiving the entertainment. This person may be the same or may be a different person from the person designated for receiving the bill. There must also be a way for the caller to identify the product or service desired. This may be a code punched into the cellphone when the caller first makes the call to the delivery station, or may be a menu-driven system, in which the caller identifies the desired entertainment by a series of responses or entries.

Wireless communications devices other than cellular telephones may also practice the method. Personal digital assistants, or other wireless communication devices with audio and/or video components may be used to communicate entertainment desires to a delivery station or service. For these devices, information exchange may occur via one or more menu-driven screens, in which the menus appear with a visual content rather than an audio context, or may also be both video and audio. In any case, the same exchange of information is necessary to complete the transaction, that is, identifying the customer, ordering the entertainment, billing the customer, perhaps via a cell phone number or an account number, and delivering the entertainment to the customer.

In one embodiment, a caller may use a wireless personal digital assistant to access the Internet or the Worldwide Web. The caller may then enter a website URL for the entertainment or delivery company, and order entertainment via a series of entries in response to web-enabled queries, the entries relayed over a wireless network to the entertainment or delivery company. The delivery company can easily identify the customer via the information entries, or by the use of stored information such as "cookies," and can identify the programming desired as well. Delivery then occurs as described above.

Figure 4:
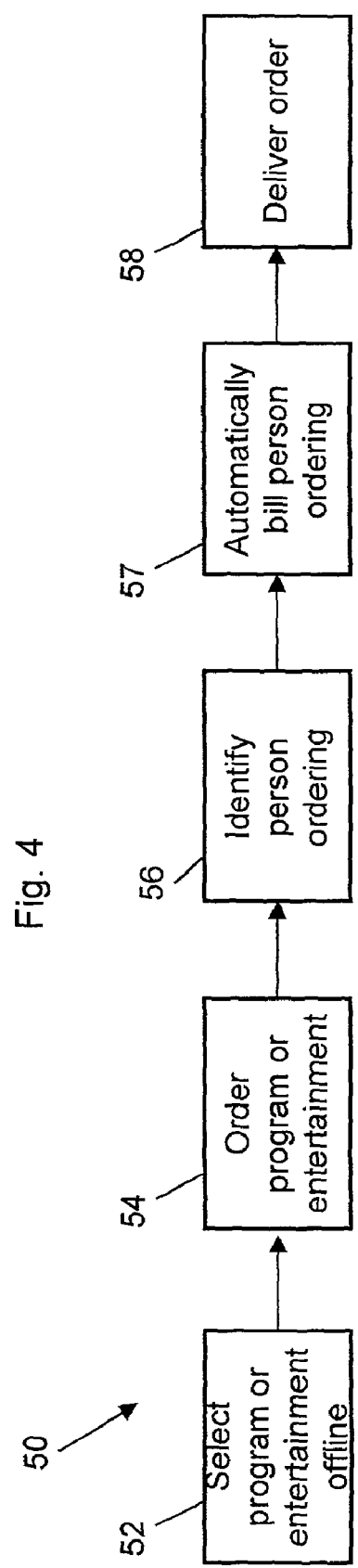

FIG. 4 depicts another method 50. A user or customer may select a desired program or entertainment 52 offline, before accessing a delivery company. At some point thereafter, the customer accesses the delivery company and the desired program or entertainment 54 is ordered automatically. The customer identifying information, as described above, may be gathered automatically 56, as from signals from the operation of a wireless communication device, or may be discrete or pre-programmed entries from the wireless communication device. In order to quickly and efficiently process the order, the information should enable the delivery station to automatically bill for the service 57, and then deliver the order 58 to a preselected receiver. As mentioned above, there are alternate ways to practice the invention, in which the person ordering is not the person responsible for the bill, and the person ordering may not be the person to whom the delivery station sends the programming. In the preferred embodiment, however, the person ordering is responsible for the bill and receives the order.

Figure 5:
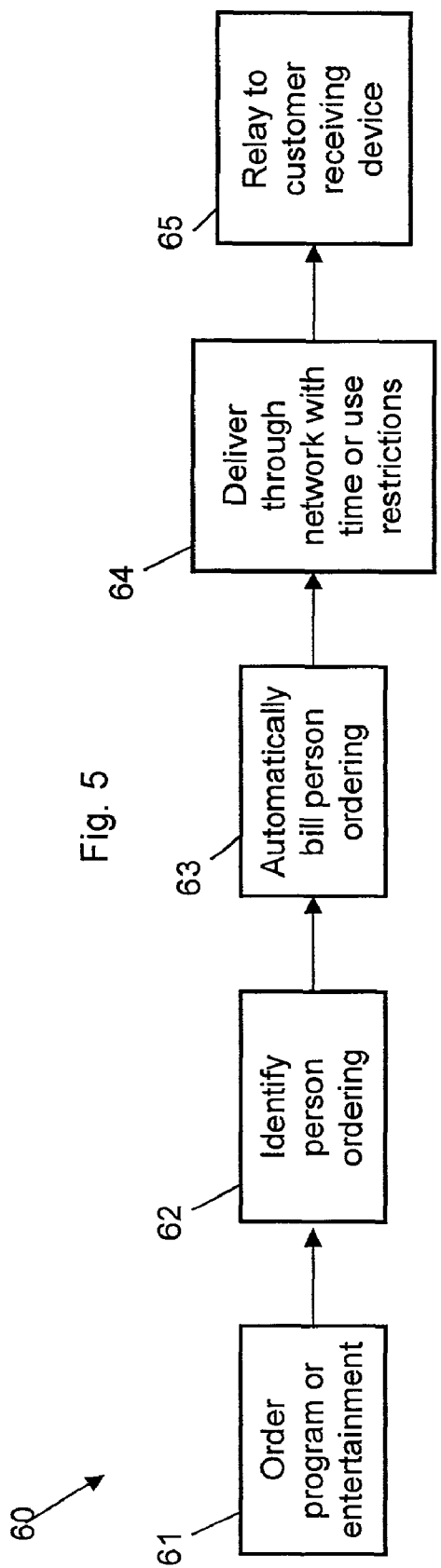

FIG. 5 depicts yet another way 60 to practice the method. In this method, a person orders a program or entertainment 61, identifies himself or herself 62, and the delivery station or company automatically bills the person 63. In this method, the entertainment is delivered through a wireless network 64, but may not be delivered directly to the customer, but rather through some intermediary 65. This intermediary may be a memory device, such as a memory on a wireless communications medium or device. In this method, the delivery station may deliver the service or product with restrictions, for instance, the entertainment or programming may be viewed only once or a limited number of times. In one way of practicing the invention, a program is sent to a memory device on the cellphone and the cellphone is then connected to a viewer, such as a television set in the customer's home, for viewing. In another way of practicing the invention, a memory device on the viewer's television set receives the programming for later viewing.

Figure 6:
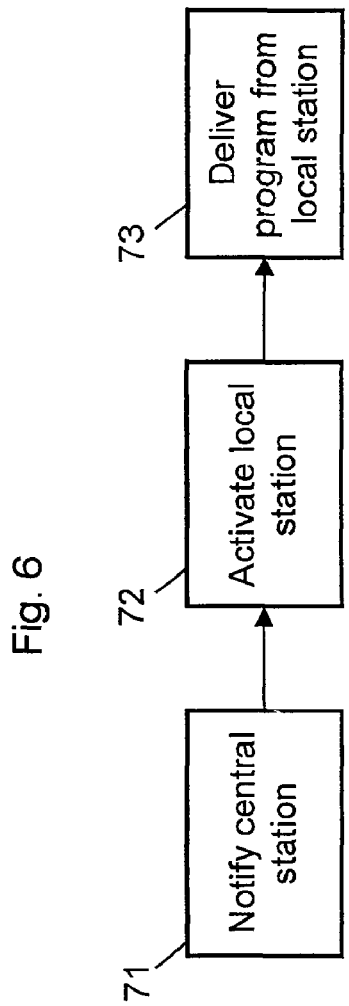

FIG. 6 depicts yet another way 71 of practicing the invention, wherein a central station receives the programming ordered by the customer, activates a local station to send the programming 72 to the customer when the customer desires the programming. For example, the program could be downloaded from the central station to the local station, which would then download or stream it to the customer 73 at the appropriate time.

This invention uses wireless communications devices, including cellphones, which in some countries use frequencies from about 900 MHz to about 1900 MHz. Other countries may use other frequencies, both lower, such as frequencies normally used for television, 50-800 MHz, or higher, frequencies above 2 GHz. The requirement is simply that the signal and bandwidth used are sufficient to contain the information required to convey the programming or entertainment. Thus, digital conversion of the signal may be accomplished and sent to the customer via a convenient frequency, rather than analog signals. The entertainment enterprise or delivery station may also use other techniques well known in communications arts, including encryption and decryption, video and audio signal compression, and code-division multiple access (CDMA).

FIGS. 7 and 8 depict specific ways of accessing entertainment over a wireless network. In FIG. 7, a user has ordered entertainment and the entertainment is being delivered over a wireless network 14 to a wireless communication device 12, such as a cellphone, a personal digital assistant (PDA), or a pen-driven hand-held communications computer. The wireless device interfaces with a receiver 78 or other device capable of receiving and recording associated communication signals. The receiver is capable of utilizing the signals for viewing on a television 80 or a projector 82 used with a screen 84, either the television or the projector being used to view the entertainment or programming ordered.

In another embodiment depicted in FIG. 8, a special purpose cellphone 86 has received the program signals from the wireless network (not shown) and is transmitting received signals to an entertainment center 88 in a streaming format and/or to a memory device 90 for recording and later onetime-only playback. The memory device may work with a buffer memory 92 and the entertainment center to utilize the signals for routing to one or more speakers 94 if the entertainment ordered includes an audio portion, such as a motion picture or a musical selection. The entertainment may have a video portion, such as a television program or a computer-type game, which may be viewed on a television or CRT screen 96. Not shown are other well-known devices useful in utilizing such programming or entertainment, such as a mouse or joy-stick useful in playing video games.

It will be recognized that there are many ways to practice the invention. For instance, the sequence of operations used in ordering entertainment could have more steps. Examples would be credit verification or an accounts receivable check on the person or account ordering entertainment, before the step of delivering entertainment. The invention may be practiced by more than one company; for instance, a cell phone company may contract with an entertainment company or any other media company to provide entertainment. A cell phone company may also contract with more than one content providers to provide entertainment to customers. The prime contractor need not be a cell phone company, but could be an entertainment company working with communications media to provide entertainment. Accordingly, it is the intention of the applicant to protect all variations and modifications within the valid scope of the present invention. It is intended that the invention be defined by the following claims, including all equivalents.

I claim:

1. A method for providing entertainment, comprising:
ordering entertainment using a telephone;
billing an account associated with a telephone;
delivering said entertainment through a wireless network to a first receiver, and storing said entertainment in a receiver memory for subsequent use;
relaying entertainment from said first receiver to a second receiver after delivering the entertainment through the wireless network, and wherein said second receiver is a television.

2. The method of claim 1, wherein the first receiver comprises a wireless communications device having audio and video components, further including automatically identifying said account by using information submitted while ordering, and wherein the method further comprises communicating said entertainment from said wireless communications device to the second receiver that the wireless communications device is connected to for viewing.

3. The method of claim 1, wherein ordering entertainment is accomplished through an Internet, and identifying said account is accomplished automatically by using information submitted while ordering.

4. The method of claim 1, wherein said ordering is communicated to a central station, wherein said central station downloads said entertainment to a local station, and wherein said delivering is accomplished by said local station communicating said entertainment to said first receiver.

5. The method of claim 1, wherein delivering is accomplished by delivering entertainment to the first receiver in accordance with selected restricted use criteria.

6. The method of claim 1, wherein delivering is accomplished by downloading entertainment to the first receiver, said entertainment having an ability to play only a specified number of times.

7. The method of claim 1, wherein delivering is accomplished by downloading entertainment with access for a limited time period, wherein the first receiver comprises a wireless communications device having audio and video components, and wherein said ordering is communicated over the internet using a URL and using a series of entries made in response to web-enabled queries.

8. The method of claim 7, wherein said telephone comprises a wireless telephone communicating with a delivery company using a wireless network, wherein customer information from ordering entertainment is used in selecting said first receiver, and further including the step of gathering customer information automatically from pre-programmed entries from said wireless telephone.

9. The method of claim 1, further comprising relaying entertainment from a central station to a local station when the ordering occurs, and then delivering said entertainment from said location station to said first receiver at a later time when a customer desires the entertainment.

10. The method of claim 1, wherein the entertainment is a motion picture, a television show, a video game, an educational, cultural or political event, sports programming, news, financial news, weather, or music.

* * * * *